United States Patent
Abe et al.

(10) Patent No.: US 7,737,594 B2
(45) Date of Patent: *Jun. 15, 2010

(54) AXIAL GAP TYPE MOTOR

(75) Inventors: Shoei Abe, Kawachi-gun (JP); Hirofumi Atarashi, Shioya-gun (JP); Keiichi Yamamoto, Haga-gun (JP); Shigeru Tajima, Tokorozawa (JP); Makoto Kawakami, Niiza (JP); Takeo Fukuda, Kawachi-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 236 days.

This patent is subject to a terminal disclaimer.

(21) Appl. No.: 11/947,260

(22) Filed: Nov. 29, 2007

(65) Prior Publication Data

US 2008/0129136 A1 Jun. 5, 2008

(30) Foreign Application Priority Data

Dec. 1, 2006 (JP) .............................. 2006-325397
Aug. 29, 2007 (JP) .............................. 2007-223053

(51) Int. Cl.
*H02K 1/27* (2006.01)
*H02K 21/12* (2006.01)

(52) U.S. Cl. ................................ 310/156.53; 310/268

(58) Field of Classification Search ............ 310/156.32, 310/156.43–156.45, 181, 268
See application file for complete search history.

(56) References Cited

U.S. PATENT DOCUMENTS

| 4,007,387 A | * | 2/1977 | Rustecki ..................... 310/181 |
| 4,996,457 A | * | 2/1991 | Hawsey et al. ............... 310/268 |
| 7,315,102 B2 | * | 1/2008 | Minagawa ............. 310/156.32 |

FOREIGN PATENT DOCUMENTS

| JP | 10271784 A | 10/1998 |
| JP | 2001136721 A | 5/2001 |
| JP | 200594955 A | 4/2005 |
| JP | 2005341696 A | 12/2005 |

* cited by examiner

*Primary Examiner*—Tran N Nguyen
(74) *Attorney, Agent, or Firm*—Westerman, Hattori, Daniels & Adrian, LLP

(57) ABSTRACT

An axial gap type motor according to the present invention includes: a rotor; and a pair of stators which are arranged to face each other and hold the rotor from both sides thereof along a rotation axis. The rotor includes: electromagnets which are provided on the rotor as main magnets, and arranged along a circumferential direction so that directions of magnetic fluxes thereof are parallel to the rotation axis; and sub permanent magnets which are provided on the rotor, arranged in the vicinities of circumferential end portions of the main magnets, and are magnetized orthogonal to the rotation axis and a radial direction.

12 Claims, 12 Drawing Sheets

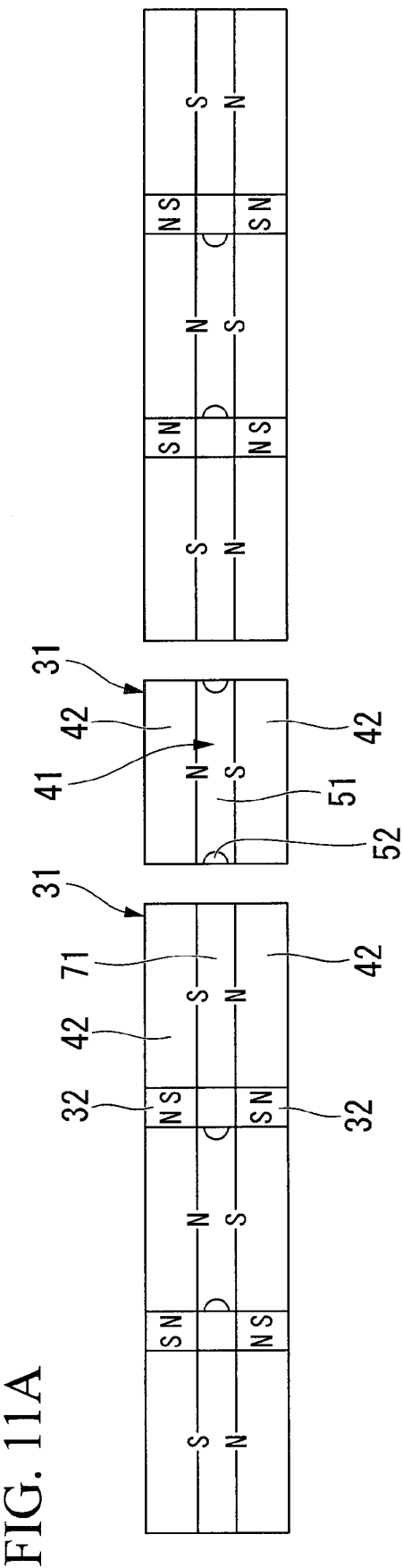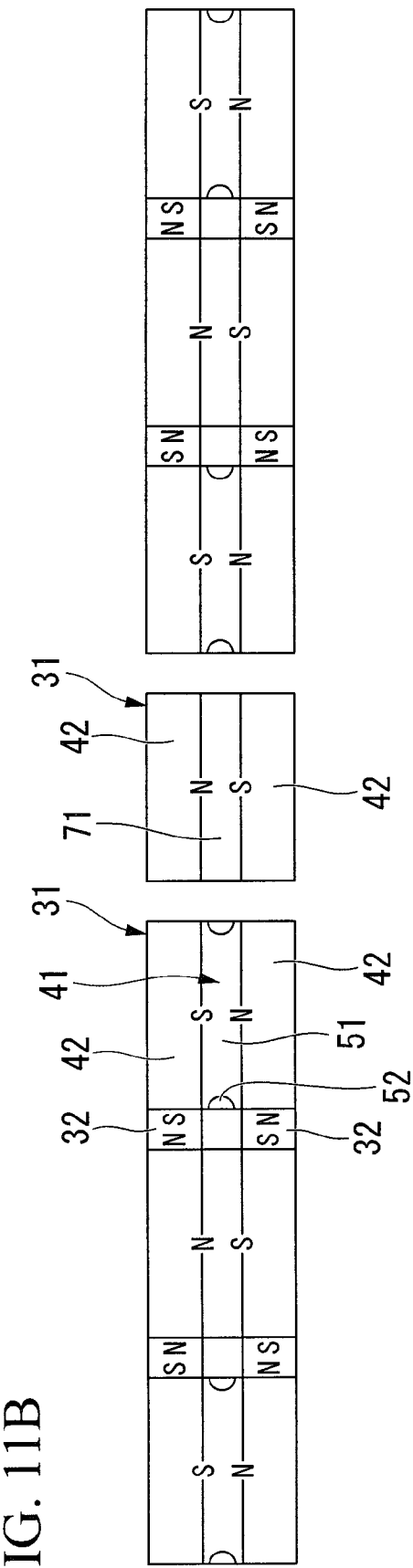
FIG. 11A
FIG. 11B

AXIAL GAP TYPE MOTOR

BACKGROUND OF THE INVENTION

1. Field of the Invention

The present invention relates to an axial gap type motor.

Priority is claimed on Japanese Patent Application No. 2006-325397, filed on Dec. 1, 2006, and Japanese Patent Application No. 2007-223053, filed on Aug. 29, 2007, the contents of which are incorporated herein by reference.

2. Description of Related Art

Conventionally, an axial gap type permanent-magnet synchronous apparatus having a rotor and a pair of stators opposed to each other and holding the rotor therebetween from both sides of a rotation axis is known. In the permanent-magnet synchronous apparatus, a magnetic flux loop is formed via the pair of stators with respect to a magnetic field flux by a permanent magnet of the rotor (refer to Japanese Unexamined Patent Application, First Publication No. H10-271784, and Japanese Unexamined Patent Application, First Publication No. 2001-136721, for example).

The above conventional permanent-magnet synchronous apparatus has a problem in which practicable revolutions and torque are limited to certain values by generation of prescribed back electromotive voltage in accordance with an induced voltage constant in high-revolution region since the induced voltage constant is a fixed value according to a construction of the rotor having the permanent magnet or the like.

SUMMARY OF THE INVENTION

The present invention is achieved in view of the above-mentioned circumstances and has an object to provide an axial gap type motor in which an induced voltage constant can be varied while restraining an increase of a permanent magnetic required for a construction of a motor.

An axial gap type motor according to the present invention includes: a rotor; and a pair of stators which are arranged to face each other and hold the rotor from both sides thereof along a rotation axis, and the rotor includes: electromagnets as main magnets and arranged along a circumferential direction so that directions of magnetic fluxes thereof are parallel to the rotation axis; and sub permanent magnets arranged in the vicinities of circumferential end portions of the main magnets, and are magnetized orthogonal to the rotation axis and a radial direction.

According to the axial gap type motor of the present invention, the state of the axial gap type motor can be set to a strong field in which a magnetic field is converged by an effect of a magnetic flux lens owing to the main magnets and the sub permanent magnets in a Halbach array or a weak field in which a short-circuit of magnetic paths are generated between the main magnets and the sub permanent magnets. Thus, magnetic flux linkage which links with a stator wire of the stators is increased or decreased by the magnetic field flux of the main magnets and the sub permanent magnets, so that the induced voltage constant is variable. As a result, a range of practicable revolutions and a range of torque of the axial gap type motor can be enlarged without increasing the permanent magnets constructing the rotor; therefore, driving efficiency can be improved and the operable range in high efficiency can be enlarged.

In the axial gap type motor of the present invention, the electromagnets may include: yokes of which sectional shapes orthogonal to the rotation axis are substantially fan-shape; a winding which is wound around the yokes, and the axial gap type motor may further includes a slip ring which connects the windings with an electric source.

In this case, the induced voltage constant can be varied while preventing a construction of the axial gap type motor from complication.

The axial gap type motor of the present invention may have a structure in which the sub permanent magnets which are adjacent to each other along the circumferential direction are arranged so that same poles thereof face each other.

In this case, the effect of the magnetic flux lens owing to a Halbach array of the main permanent magnets and sub permanent magnets can be utilized effectively when the axial gap type motor is set to the strong field; alternately, the short-circuit of the magnetic path between the main permanent magnets and the sub permanent magnets can be utilized effectively when the axial gap type motor is set to the weak field. Therefore, magnetic flux linkage in which the main permanent magnets and the sub permanent magnets link the stator windings of the stators can be increased or decreased suitably; thus, variable range of the induced voltage constant can be enlarged.

The axial gap type motor of the present invention may have a structure in which a pair of the sub permanent magnets which are adjacent to each other along the circumferential direction are disposed so as to be shifted from the electromagnets to either side along the rotation axis, and the axial gap type motor may further includes: an electrical device which reverses an electrical state from the electric source to the winding; and a setting device which sets: a strong field state in which same magnetic pole as a facing pole of the sub permanent magnetic which is faced to is applied at a position where the electric magnets are shifted; and a weak field state in which the other magnetic pole from a facing pole of the sub permanent magnetic which is faced to is applied at a position where the electric magnets are shifted by the electrical device.

In this case, the axial gap type motor is suitably set to the strong field of the weak field by the setting device.

The axial gap type motor according to the present invention may have a structure in which the main magnets include the electromagnets and the main permanent magnets.

In this case, since the plurality of main magnets are constructed by the electromagnets and the main permanent magnets, while preventing the permanent magnets constructing the rotor from increasing excessively, desired magnetic field flux can be maintained even if the current to the electromagnets becomes erratic.

The axial gap type motor according to the present invention may have a structure in which the sub permanent magnets are arranged with regular intervals along the circumferential direction.

In this case, the plurality of sub permanent magnets are arranged along the circumferential direction at regular intervals. Both of or one of a pair of the sub permanent magnets can be omitted, which are disposed between the main magnets adjacent to each other along the circumferential direction, and each of which is shifted to either side along the rotation axis. As a result, a desired magnetic field flux can be maintained while preventing the permanent magnets constructing the rotor from excessive increase.

BRIEF DESCRIPTION OF THE DRAWINGS

FIGS. 11A and 11B are exploded views from a radial direction showing a rotor of an axial gap type motor of a fourth modification of the embodiment according to the present invention.

DESCRIPTION OF THE PREFERRED EMBODIMENTS

An embodiment of an axial gap type motor according to the present invention will be described with reference to the drawings.

Figure 1:
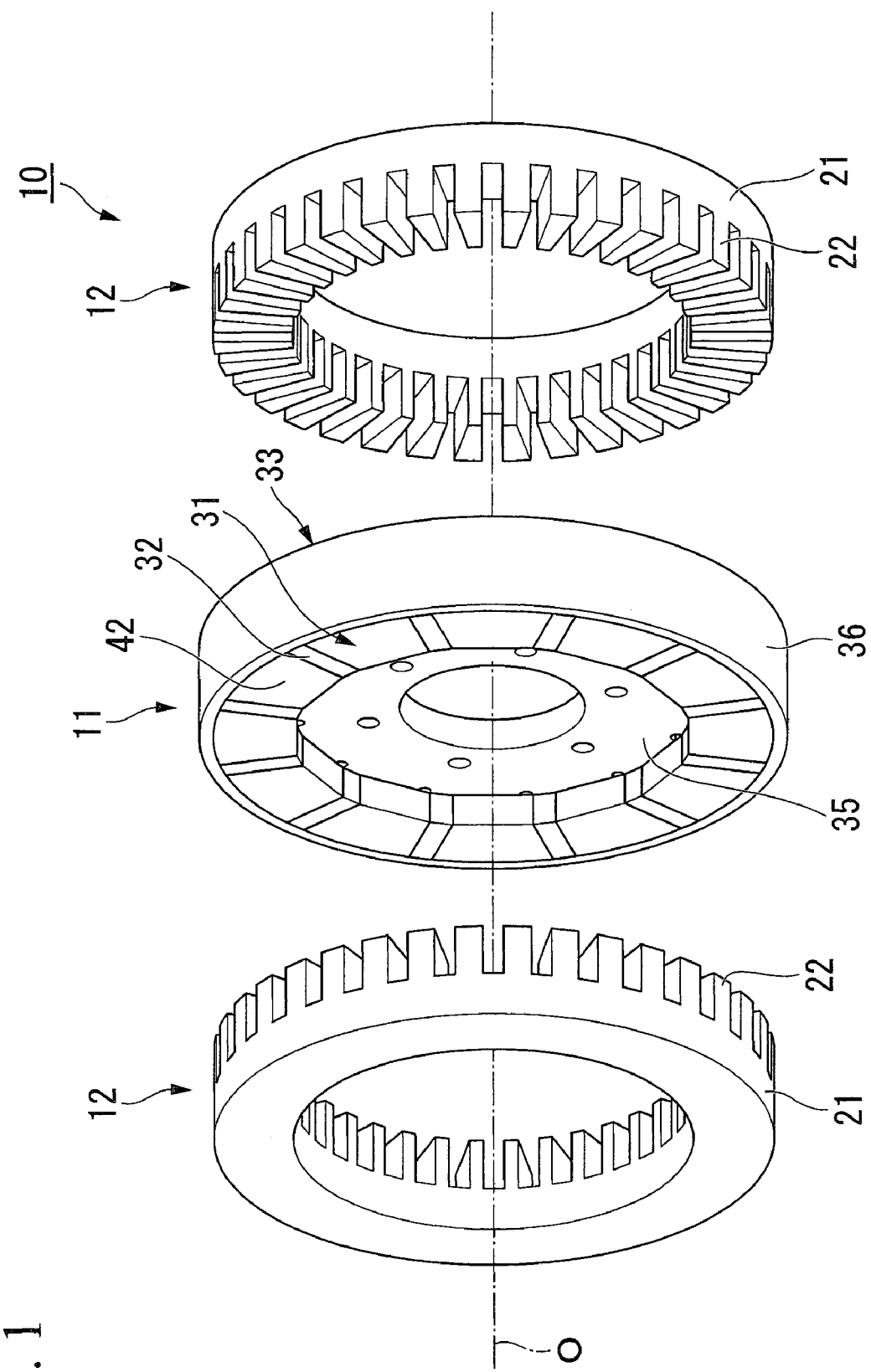
FIG. 1 is a perspective view showing an axial gap type motor of an embodiment according to the present invention.

An axial gap type motor 10 of the present embodiment has, as shown in FIG. 1, a rotor 11 having substantially a circle-shape and being provided so as to be rotatable around a rotation axis O of the axial gap type motor 10, and a pair of stators 12 holding the rotor 11 therebetween from both sides along O, facing each other, and having stator windings of phases generating a rotating magnetic field rotating the rotor 11.

The axial gap type motor 10 is mounted on, for example, a vehicle such as a hybrid vehicle, a motor vehicle, and the like. The driving force of the axial gap type motor 10 is transmitted via a transmission (not illustrated) to driving wheels of the vehicle (not illustrated) by connecting an output shaft to an input shaft of the transmission.

the axial gap type motor 10 functions as a generator and generates regenerative braking force, and recovers kinetic energy of the vehicle as electric energy (i.e., regenerative energy) when the driving force is transmitted from the driving wheels to the axial gap type motor 10 while decelerating the vehicle. Furthermore, in the hybrid vehicle, when rotation shaft of the axial gap type motor 10 is connected to a crank shaft of an internal-combustion engine (not illustrated), the axial gap type motor 10 functions as a generator and generates electric energy also when an output power of the internal-combustion engine is transmitted to the axial gap type motor 10.

The stators 12 have a substantially circular plate-shaped yoke portion 21, teeth 22 projecting toward the rotor 11 and extending along a radial direction from a surface of the yoke portion 21 facing the rotor 11 with prescribed intervals along a circumferential direction, and a stator winding (not illustrated) wound between the teeth 22.

The stators 12 are 6N type stators having six main poles (e.g., $U^+$, $V^+$, $W^+$, $U^-$, $V^-$, and $W^-$). One of the stators 12 has a $U^+$ pole, a $V^+$ pole, and a $W^+$ pole; the other stator 12 has a $U^-$ pole, a $V^-$ pole, and a $W^-$ pole. The $U^+$ pole, the $V^+$ pole, and the $W^+$ pole of the stator 12 face the $U^-$ pole, the $V^-$ pole, and the $W^-$ pole of the other stator 12 along the rotation axis direction O.

For example, with respect to the pair of stators 12 facing each other along the rotation axis O, three teeth 22 corresponding to the $U^+$ pole, the $V^+$ pole, and the $W^+$ pole of the stator 12 faces three teeth 22 corresponding to the $U^-$ pole, the $V^-$ pole, and the $W^-$ pole of the other stator 12 along the rotation axis O direction. Electrical states of the teeth 22 of the stator 12 and the teeth 22 of the other stator 12 facing each other along the rotation axis O are inversed in electrical degrees.

Figure 2:
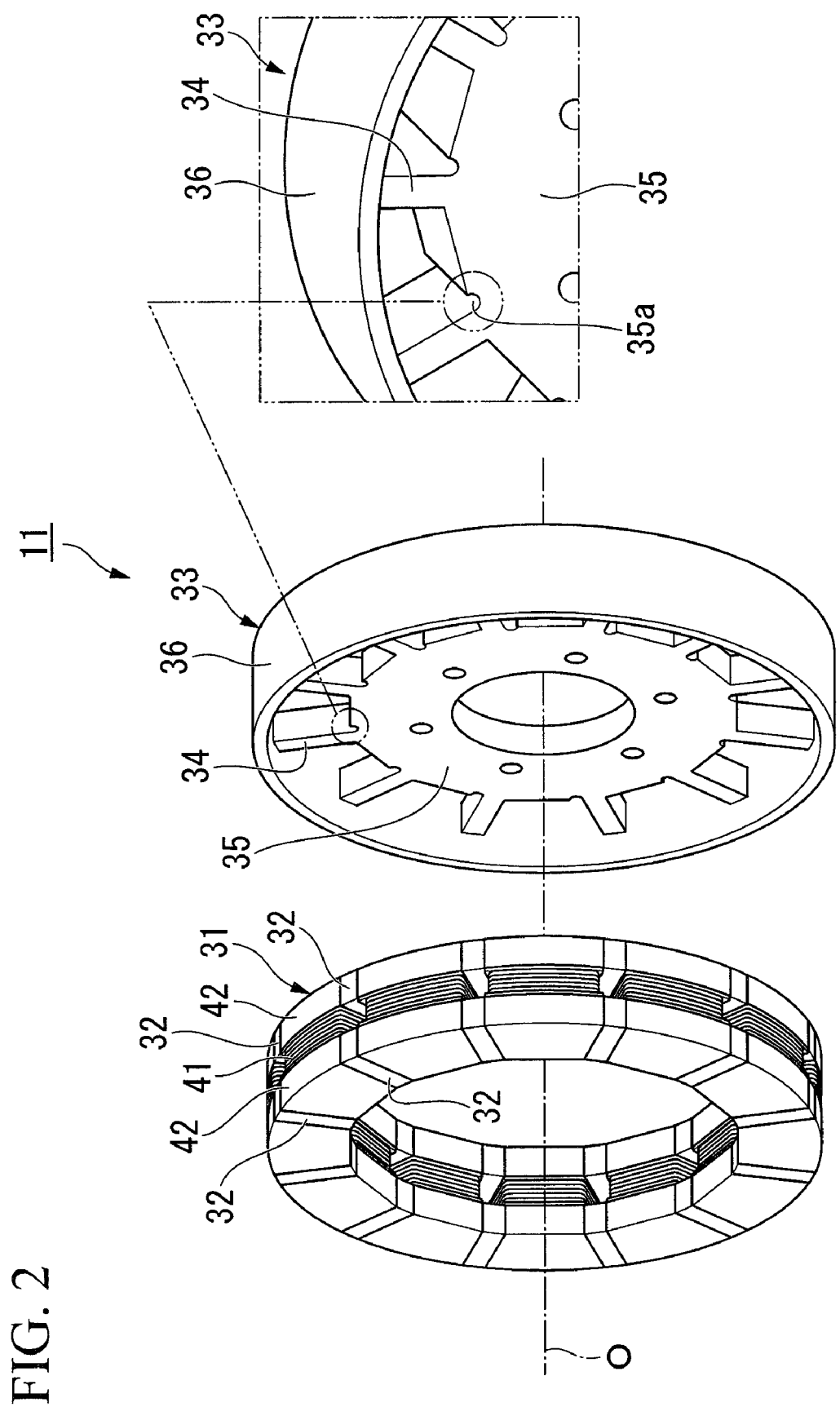
FIG. 2 is an exploded perspective view showing a rotor of the axial gap type motor of the embodiment according to the present invention with a principal portion of a rotor frame.

The rotor 11 has, as shown in FIG. 2, magnetic poles 31, sub permanent magnets 32 which are magnetized orthogonal to the rotation axis and the radial direction, and a rotor frame 33 formed from non-magnetic material.

The rotor frame 33 has an inner portion 35 and an outer cylindrical portion 36 connected with each other via radial ribs 34 arranged with prescribed intervals along the circumferential direction. The inner portion 35 is formed in a circular-plate shape and connected to an external drive shaft (e.g., an input shaft of a transmission of a vehicle).

The magnetic poles 31 disposed in the rotor frame 33 are held between the inner portion 35 and the outer cylindrical portion 36 along the radial direction and adjacent to each other along the circumferential direction with the radial ribs 34 therebetween.

Figure 3:
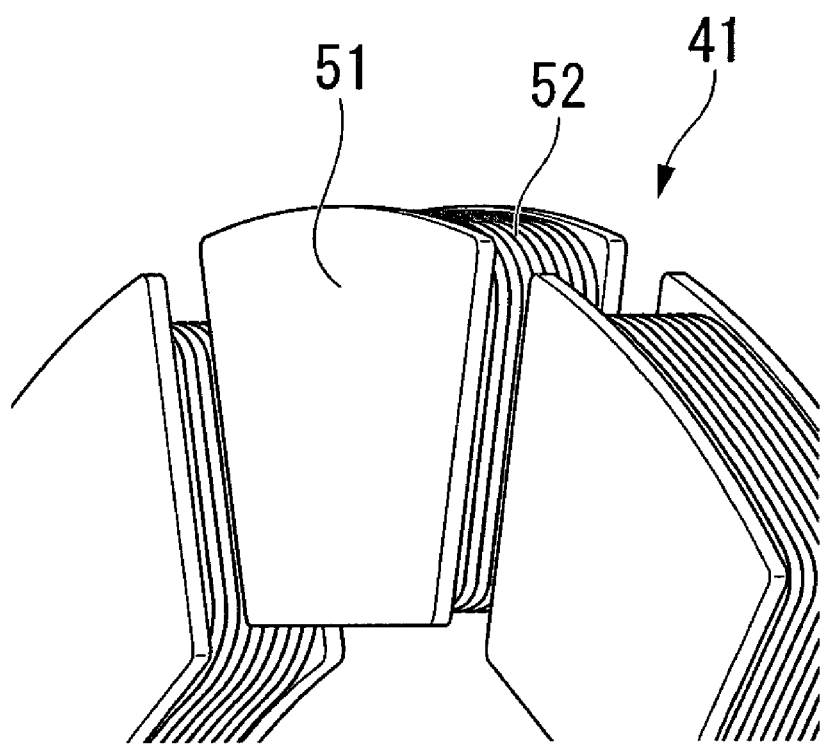
FIG. 3 is a perspective view showing a principal portion of an electromagnet of the rotor of the embodiment according to the present invention.
Figure 4:
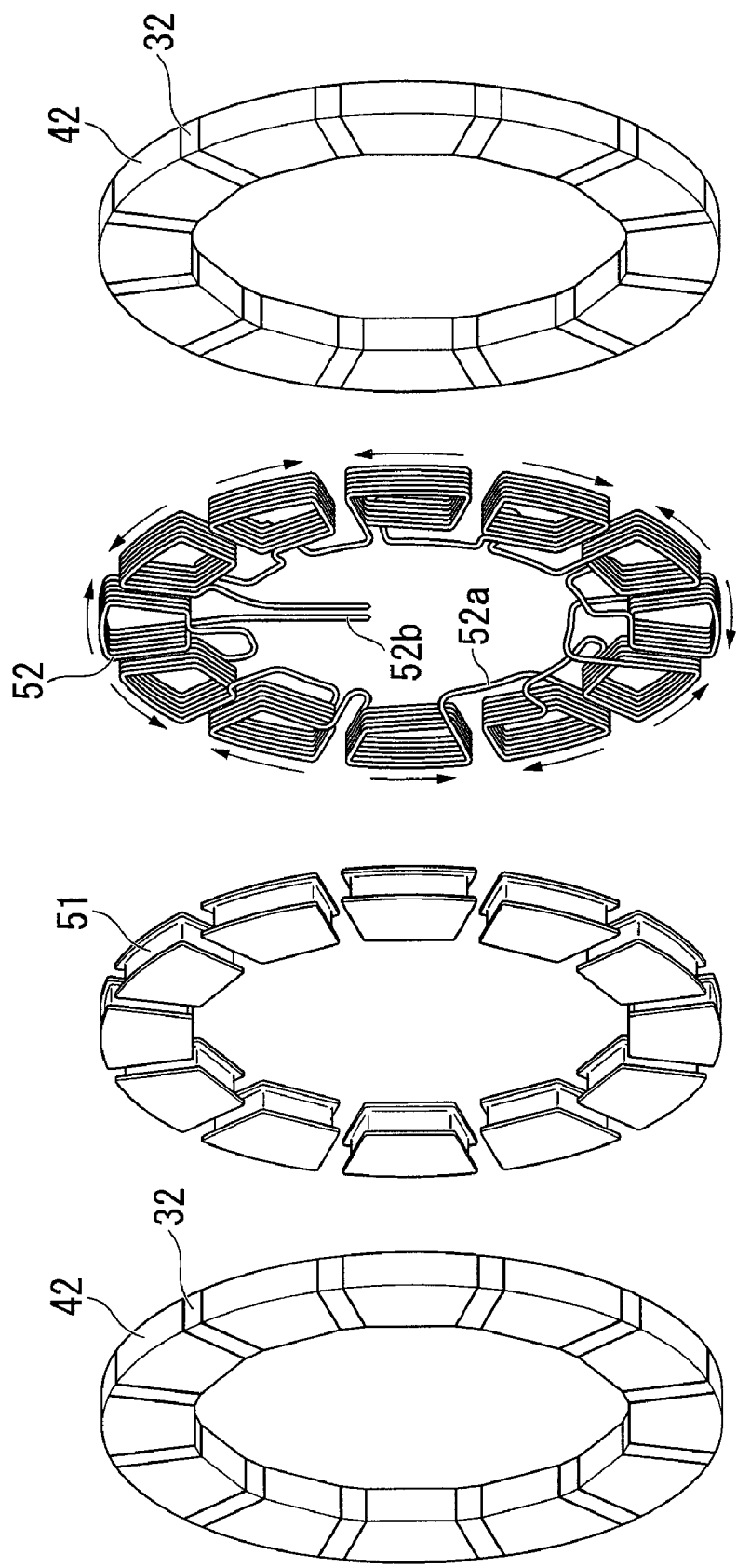
FIG. 4 is an exploded perspective view showing the rotor of the axial gap type motor of the embodiment according to the present invention.

The magnetic poles 31 have, as shown in FIGS. 2 to 4 for example, electromagnets 41 which generate magnetic flux parallel to the rotation axis O, and a pair of substantially fan-plate shaped magnetic members 42 which hold the electromagnets 41 there between from both sides of the rotation axis O.

The sub permanent magnets 32 are arranged at circumferential end portions of the electromagnets 41.

Each electromagnet 41 has, as shown in FIG. 3 and FIG. 4 for example, a substantially bobbin-shaped yoke 51 in which a center axis thereof is parallel to the rotation axis O, and a coil 52 (i.e., a winding) wound on the yoke 51 around the center axis. The pair of magnetic members 42 are fixed to the yoke 51 so as to hold the yoke 51 from both sides along a thickness direction (i.e., a direction parallel to the rotation axis O).

The electromagnets 41 which are adjacent along the circumferential direction in the rotor frame 33 are arranged so that respective magnetic fluxes are generated in opposite directions. In other words, an electromagnet 41 of which the coil 52 is wound clockwise is adjacent along the circumferential direction to an electromagnet 41 of which the coil 52 is wound counter clockwise.

One of the inner portion 35 and the outer cylindrical portion 36 which holds the electromagnets 41 from both sides of the radial direction therebetween in the rotor frame 33, e.g., the inner portion 35 is provided with concave grooves 35a extending parallel to the rotation axis O on the outer circumferential surface thereof. A connecting wire 52a which connects the coils 52 of the electromagnets 41 adjacent along the circumferential direction or a leading wire 52*b* which is led out from the prescribed coil 52 is equipped with the concave grooves 35*a*.

The sub permanent magnets 32 are arranged between the magnetic poles 31 which are adjacent along the circumferential direction at both sides of the rotation axis O. The sub permanent magnets 32 which are adjacent along the circumferential direction hold the magnetic members 42 of the magnetic poles 31 therebetween from both sides of the circumferential direction.

As a result, the sub permanent magnets 32 at one side of the rotation axis O and the sub permanent magnets 32 at the other side of the rotation axis O face each other along the rotation axis O direction via the radial ribs 34 of the rotor frame 33.

The pair of sub permanent magnets 32 which face each other along the circumferential direction via the magnetic member 42 are magnetized in different directions from each other. Also, the pair of sub permanent magnets 32 which face each other along the rotation axis O via the radial ribs 34 of the rotor frame 33 are magnetized in different directions from each other.

That is to say, when the pair of sub permanent magnets 32 which face each other along the circumferential direction at one side of the rotation axis O are arranged so that the N-pole thereof face each other, the pair of sub permanent magnets 32 which face each other along the circumferential direction at the other side of the rotation axis O are arranged so that the S-pole thereof face each other.

As a result, with respect to a magnetic pole which can be virtually set at either side of the rotation axis O with respect to the magnetic flux which is generated by the electromagnets 41 of the magnetic pole 31 and a facing magnetic pole of the pair of sub permanent magnets 32 which face the above electromagnets 41 along the circumferential direction at either side of the rotation axis O, at either side of the rotation axis O, a strong field is generated when the magnetic pole of the electromagnet 41 and the facing poles of the pair of sub permanent magnets 32 are the same pole; or a weak field is generated when the magnetic pole of the electromagnets 41 and the facing poles of the pair of sub permanent magnets 32 are the same.

That is to say, when a strong field is generated, owing to the effect of a magnetic flux lens by a Halbach array of the electromagnets 41 and the pairs of sub permanent magnets 32, the magnetic fluxes of the electromagnets 41 and the pairs of sub permanent magnets 32 are converged; and effective fluxes which link the stators 12 are relatively increased.

When a weak field is generated, at either side of the rotation axis O, short-circuit magnetic paths are generated between the electromagnets 41 and the pairs of sub permanent magnets 32; and effective fluxes which link the stators 12 are relatively decreased.

Figure 5:
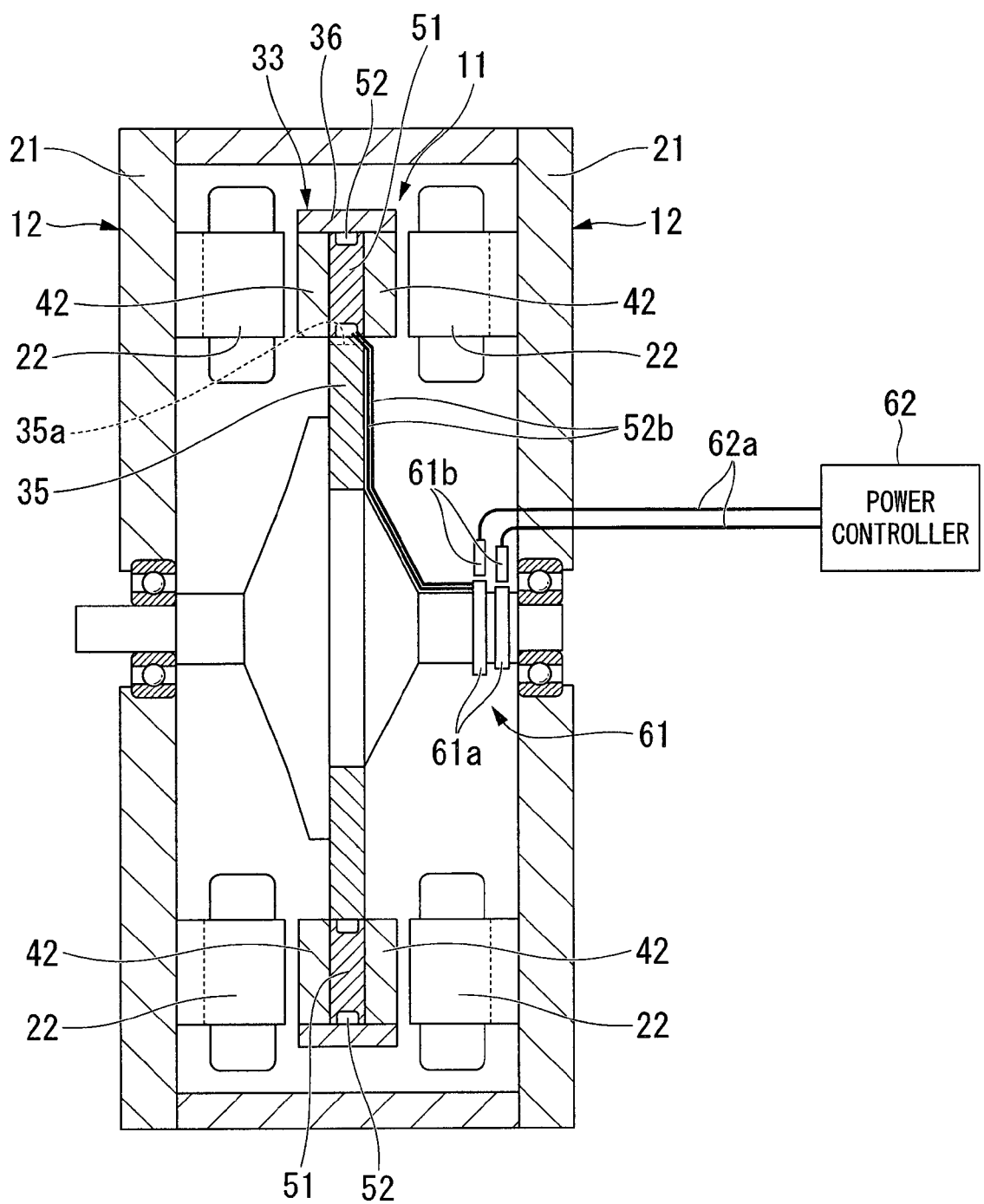
FIG. 5 is a sectional view showing the rotor of the axial gap type motor according to the embodiment of the present invention.

As shown in FIG. 5, among the electromagnets 41 of the magnetic poles 31 attached in the rotor frame 33, the electromagnet 41 having a coil 52 to which the leading wire 52*b* is connected is connected to an external power controller 62 (i.e., an electrical device and a setting device) via a slip ring 61.

The slip ring 61 includes ring portions 61*a* which are fixed to the rotor 11, and brush portions 61*b* which are fixed to the stator 12. The power controller 62 is connected to the brush portions 61*b* via connecting wires 62*a*.

The power controller 62 has a bridge circuit or the like and can reverse the electrical state of the electric source (not illustrated) to the coils 52; as a result, the electrical state of the axial gap type motor 10 can be switched between a strong field and a weak field.

As described above, according to the axial gap type motor 10 of the present embodiment, the state of the axial gap type motor 10 can be set to a strong field in which the magnetic field is converged by the effect of the magnetic flux lens owing to the electromagnets 41 and the sub permanent magnets 32 in a Halbach array or a weak field in which the short-circuit of the magnetic paths are generated between the electromagnets 41 and the sub permanent magnets 32. Thus, magnetic flux linkage which links with a stator wire of the stators 12 is increased or decreased by the magnetic field flux of the electromagnets 41 and the sub permanent magnets 32, so that the induced voltage constant is variable. As a result, the range of practicable revolutions and the range of torque of the axial gap type motor 10 can be enlarged without increasing the permanent magnets constructing the rotor 11; therefore, the driving efficiency can be improved and a drivable region in high-efficiency can be enlarged.

Furthermore, since direct current is transmitted from the power controller 62 to the electromagnets 41 via the slip ring 61, voltage fluctuations are relatively small with low frequency, so that wastage of the slip ring 61 can be restrained, and the construction of the power controller 62 becoming complicated can be prevented.

In addition, even if the current to the electromagnets 41 becomes erratic, a desired magnetic field flux can be maintained by providing the sub permanent magnets 32.

Figure 6:
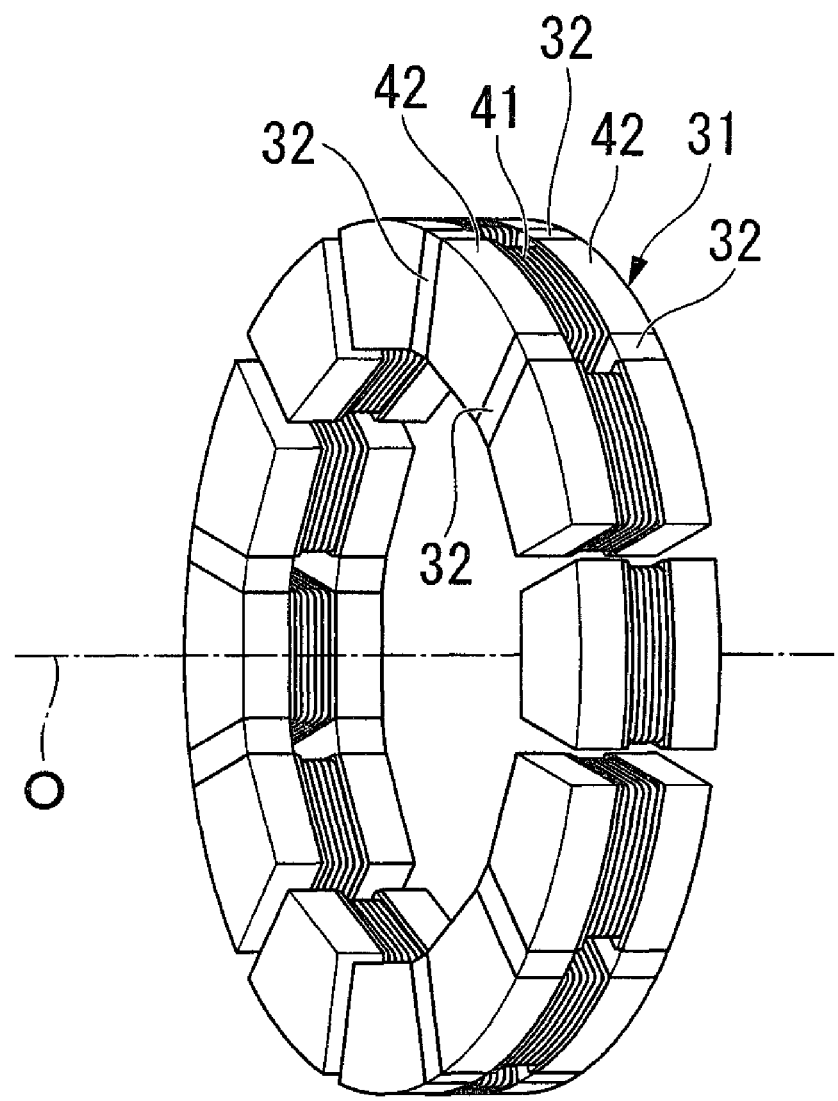
FIG. 6 is an exploded perspective view showing a principal portion of a rotor of an axial gap type motor according to a first modification of the embodiment of the present invention.
Figure 7:
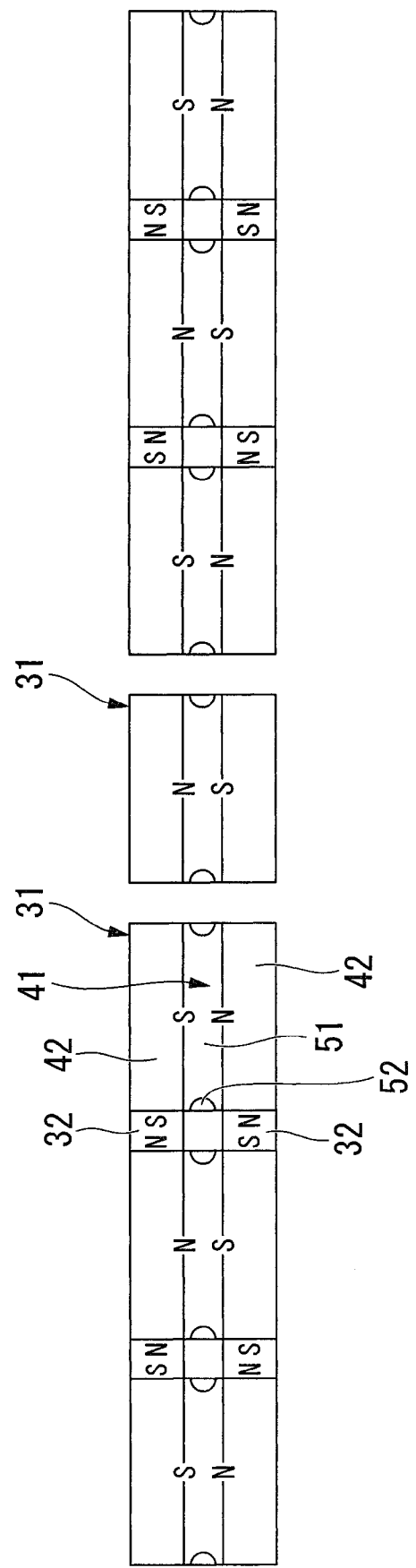
FIG. 7 is an exploded view from a radial direction showing the rotor of the axial gap type motor of the first modification of the embodiment according to the present invention.
Figure 8:
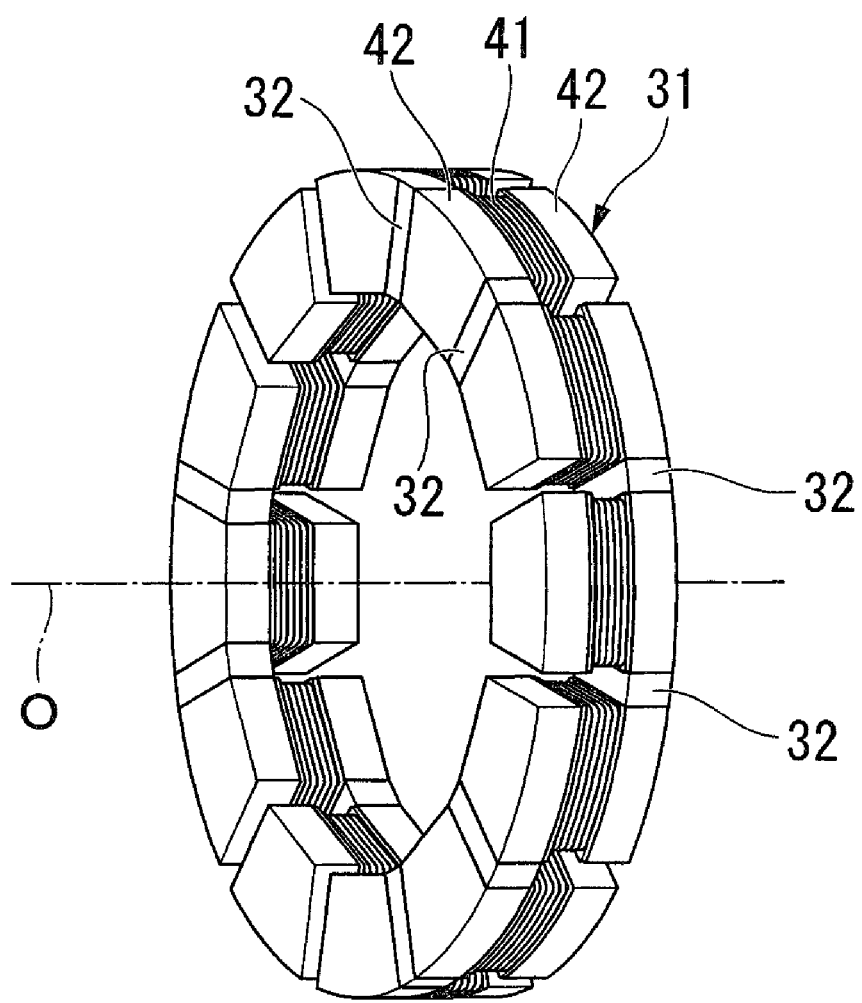
FIG. 8 is an exploded perspective view showing a principal portion of a rotor of an axial gap type motor according to a second modification of the embodiment of the present invention.
Figure 9:
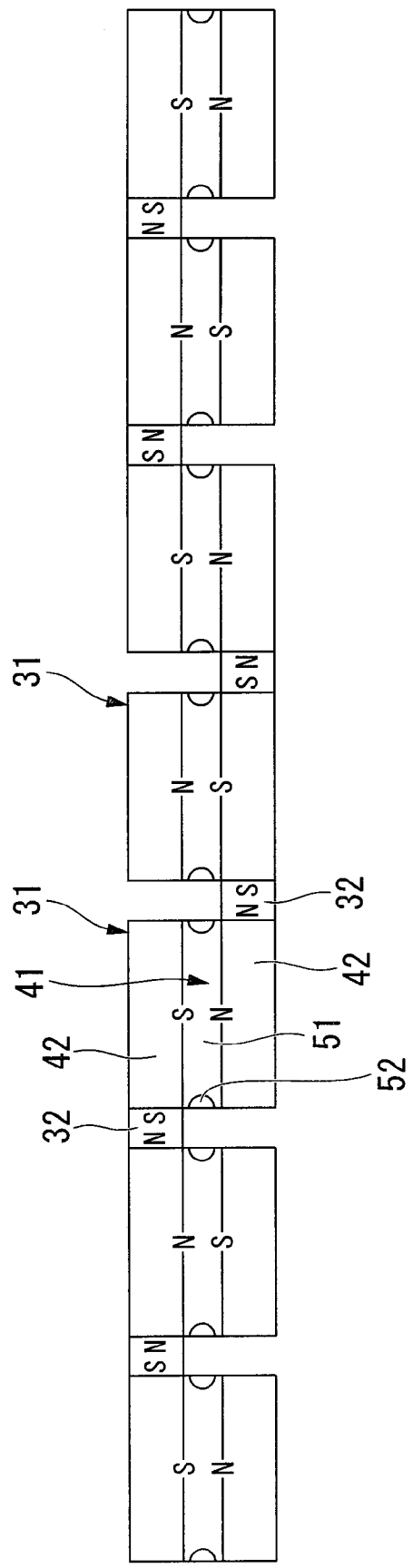
FIG. 9 is an exploded view from a radial direction showing the rotor of the axial gap type motor of the second modification of the embodiment according to the present invention.

The pairs of sub permanent magnets 32 are provided between the magnetic poles 31 adjacent to each other along the circumferential direction in the above embodiment; however, the present invention is not limited to this embodiment. For example, as shown in FIGS. 6 to 9, the sub permanent magnets 32 may be arranged along the circumferential direction with regular intervals. In addition, as shown in FIGS. 6 and 7 of the first modification, both of the sub permanent magnets 32 can be omitted, which are disposed between the magnetic poles 31 adjacent to each other along the circumferential direction, and each of which is shifted to either side along the rotation axis O. Alternatively, as shown in FIGS. 8 and 9 of a second modification, one of the sub permanent magnets 32 can be omitted, which are disposed between the magnetic poles 31 adjacent to each other along the circumferential direction, and each of which is shifted either side along the rotation axis O.

In the first modification shown in FIGS. 6 and 7, with respect to gaps between the plurality of magnetic poles 31, two gaps between the magnetic poles 31 with pairs of the sub permanent magnets 32 and two gaps between the magnetic poles 31 without pairs of the sub permanent magnets 32 are arranged alternately along the circumferential direction.

In the second modification shown in FIGS. 8 and 9, with respect to gaps between the plurality of magnetic poles 31, two gaps between the magnetic poles 31 with pairs of sub permanent magnets 32 at one side of the rotation axis O and two gaps between the magnetic poles 31 without pairs of sub permanent magnets 32 at the other side of the rotation axis O are arranged alternately along the circumferential direction.

According to the first and second modifications, the desired magnetic field flux can be maintained while preventing increasing unnecessary permanent magnets for constituting the rotor 11.

Note, the electromagnets 41 in FIGS. 7 and 9 are set to produce a strong field.

In the first and second modifications, non-magnetic material member (more preferably, non-magnetic and non-conducting material member) may be disposed where the sub permanent magnets 32 are omitted; alternately, empty spaces may be provided.

Figure 10:
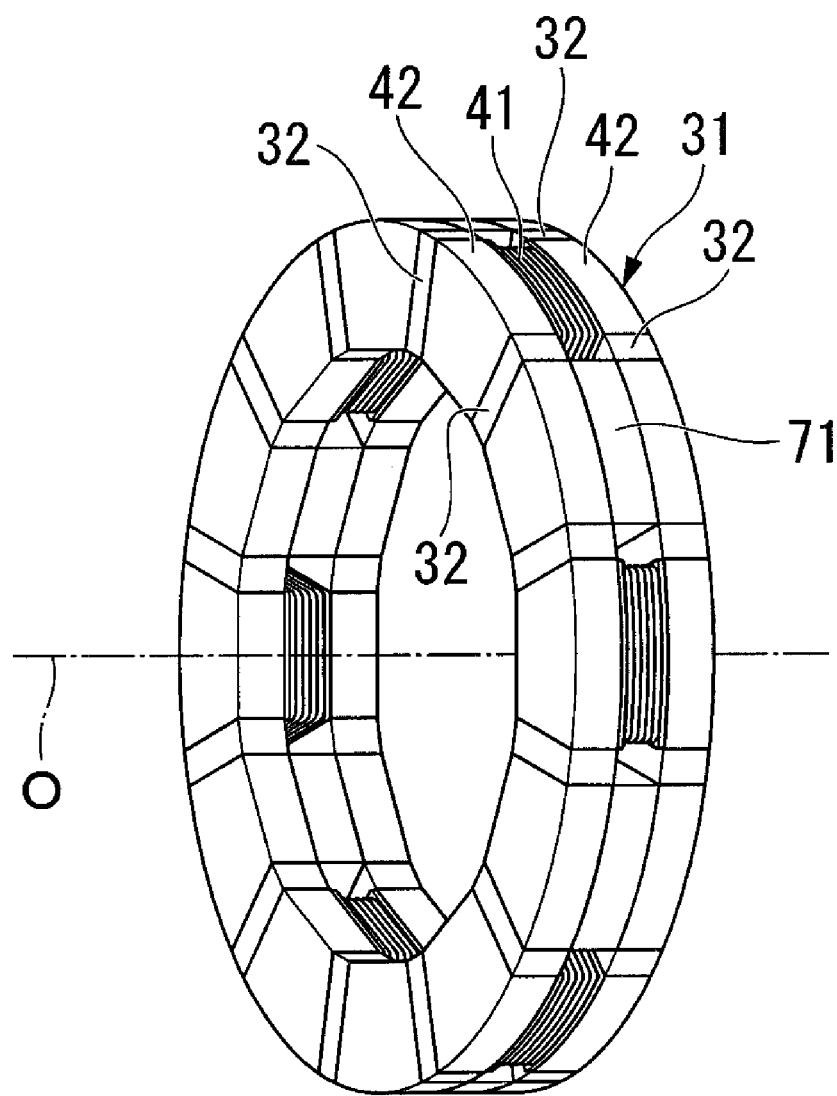
FIG. 10 is an exploded perspective view showing a principal portion of a rotor of an axial gap type motor according to a third modification of the embodiment of the present invention.

The magnetic poles 31 are provided with the electromagnets 41 and a pair of the magnetic members 42 in the above embodiment; however, the present invention is not limited to the above embodiment. For example, as shown in FIG. 10 of a third modification, main permanent magnets 71 may be replaced for any of the magnetic poles 31 among the plurality of the magnetic poles 31.

In the third modification, with respect to the magnetic poles 31 arranged along the circumferential direction, the electromagnets 41 and the main permanent magnets 71 are arranged alternately along the circumferential direction. The main permanent magnets 71 have substantially a fan-shape the same as the magnetic member 42 and magnetized along the rotation axis O.

As a result, the permanent magnets are prevented from excessive increase for constructing the rotor 11 and a desired magnetic field flux can be maintained even if the current to the electromagnets 41 becomes erratic.

In addition, in the third modification, as the first and second modification described above, the plurality of sub permanent magnets 32 may be arranged along the circumferential direction with regular intervals. Also, as shown in FIGS. 11A and 11B of a fourth modification, both of the sub permanent magnets 32 can be omitted, which are disposed between the magnetic poles 31 adjacent to each other along the circumferential direction, and each of which is shifted to either side along the rotation axis O. Alternatively, as shown in FIGS. 12A and 12B of a fifth modification, one of the sub permanent magnets 32 can be omitted, which are disposed between the plurality of magnetic poles 31 adjacent to each other along the circumferential direction, and each of which is shifted to either side along the rotation axis O.

In the fourth modification shown in FIGS. 11A and 11B, with respect to gaps between the plurality of magnetic poles 31, two gaps without a pair of sub permanent magnets 32 and two gaps with a pair of sub permanent magnets 32 are arranged alternately along the circumferential direction. Further, a pair of the sub permanent magnets 32 are omitted at both ends of the subscribed electromagnets 41 or the main permanent magnet 71 along the circumferential direction.

Figure 12A:
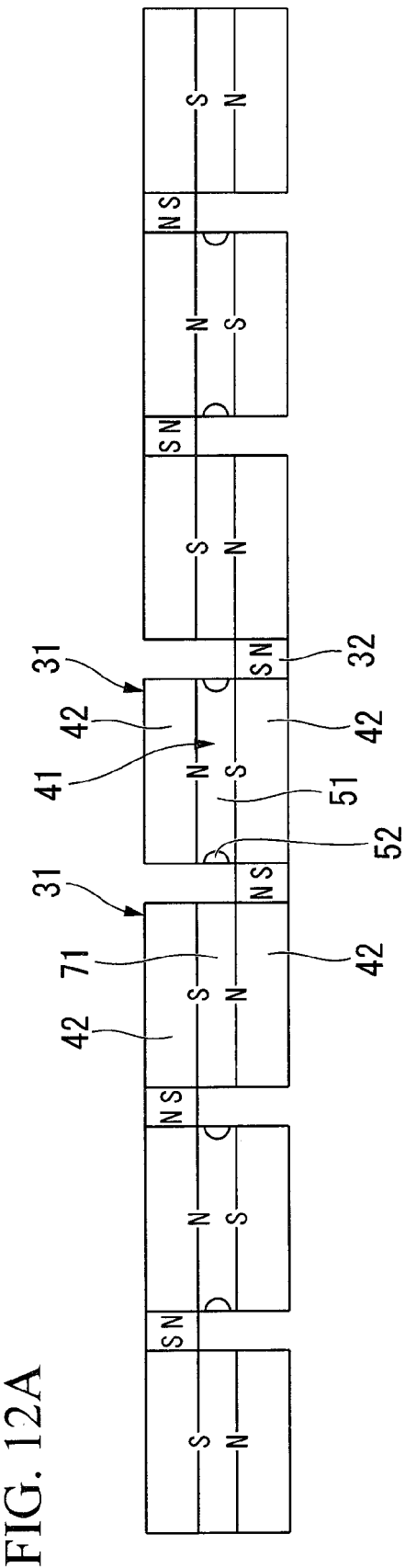
FIGS. 12A and 12B are exploded views from a radial direction showing a rotor of an axial gap type motor of a fifth modification of the embodiment according to the present invention.
Figure 12B:
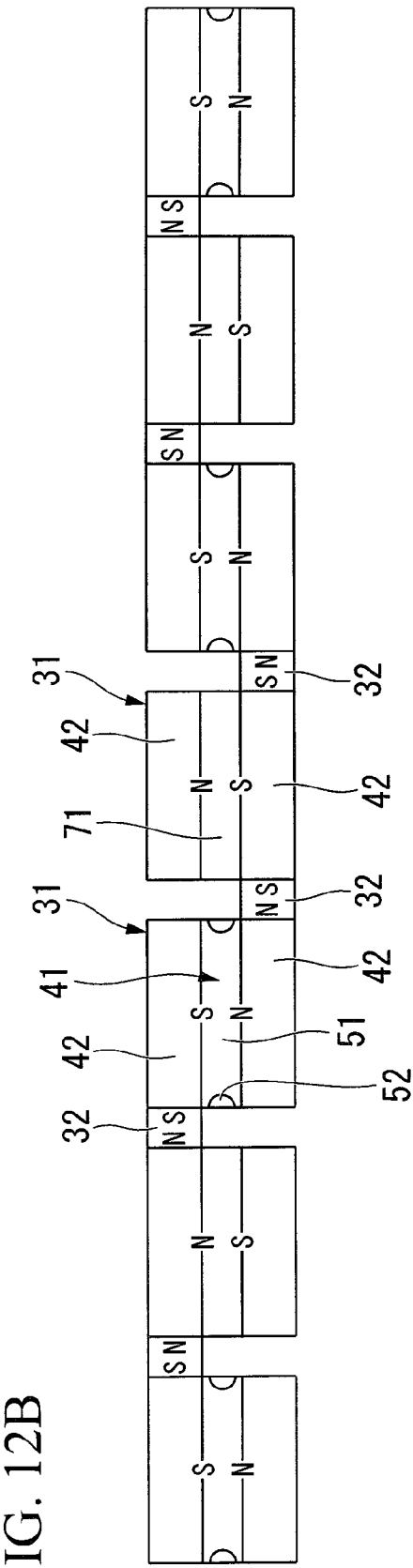

In the fifth modification shown in FIGS. 12A and 12B, with respect to gaps between the plurality of magnetic poles 31, two gaps between the magnetic poles 31 with pairs of sub permanent magnets 32 at one side of the rotation axis O and two gaps between the magnetic poles 31 without pairs of sub permanent magnets 32 at the other side of the rotation axis O are arranged alternately along the circumferential direction. Further, one of the sub permanent magnets 32 is omitted at both ends of the subscribed electromagnets 41 or the main permanent magnet 71 along the circumferential direction.

The electromagnets 41 shown in FIGS. 11A, 11B, 12A and 12B are set to produce a strong field In the fourth and fifth modifications, non-magnetic material member (more preferably, non-magnetic and non-conducting material member) may be disposed where the sub permanent magnets 32 are omitted; alternately, empty spaces may be provided.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An axial gap motor comprising:
   a rotor; and
   a pair of stators which are arranged to face each other and hold the rotor from both sides thereof along a rotation axis, wherein the rotor includes:
   electromagnets as main magnets, and arranged along a circumferential direction so that directions of magnetic fluxes thereof are parallel to the rotation axis; and
   sub permanent magnets arranged in the vicinities of circumferential end portions of the main magnets, and are magnetized orthogonal to the rotation axis and a radial direction, and wherein:
   the sub permanent magnets which are adjacent to each other along the circumferential direction are arranged so that the same poles thereof face each other; and
   a pair of the sub permanent magnets which are adjacent to each other along the circumferential direction is disposed so as to be shifted from the electromagnets to either side thereof along the rotation axis.

2. The axial gap motor according to claim 1, wherein the electromagnets include:
   yokes of which sectional shapes orthogonal to the rotation axis are substantially fan-shape; and
   a winding which is wound around the yokes, and
   the axial gap motor further comprises a slip ring which connects the windings with an electric source.

3. The axial gap motor according to claim 2, further comprising:
   an electrical device which reverses an electrical state from the electric source to the winding; and
   a setting device which sets: a strong field state in which the same magnetic pole as a pole facing the sub permanent magnet which is applied at a position where the electric magnets are shifted; and a weak field state in which the other magnetic pole from a pole facing the sub permanent magnet which is applied at a position where the electric magnets are shifted by the electrical device.

4. The axial gap motor according to claim 1, wherein the main magnets include the electromagnets and main permanent magnets.

5. The axial gap motor according to claim 1, wherein the sub permanent magnets are arranged with regular intervals along the circumferential direction.

6. The axial gap motor according to claim 5, wherein two gaps between the main magnets with pairs of the sub permanent magnets at one side of the rotation axis and two gaps between the main magnets without pairs of the sub permanent magnets at another side of the rotation axis are arranged alternately along the circumferential direction of the rotor.

7. The axial gap motor according to claim 6, wherein the main magnets include the electromagnets and main permanent magnets.

8. The axial gap motor according to claim 7, wherein the electromagnets and the main permanent magnets are arranged alternately along the circumferential direction of the rotor.

9. The axial gap motor according to claim 5, wherein two gaps between the main magnets with pairs of the sub permanent magnets and two gaps between the main magnets without pairs of the sub permanent magnets are arranged alternately along the circumferential direction of the rotor.

10. The axial gap motor according to claim 9, wherein the main magnets include the electromagnets and main permanent magnets.

11. The axial gap motor according to claim 10, wherein the electromagnets and the main permanent magnets are arranged alternately along the circumferential direction of the rotor.

12. An axial gap motor comprising:
- a rotor; and
- a pair of stators which are arranged to face each other and hold the rotor from both sides thereof along a rotation axis, wherein the rotor includes:
- electromagnets as main magnets, and arranged along a circumferential direction so that directions of magnetic fluxes thereof are parallel to the rotation axis; and
- sub permanent magnets arranged in the vicinities of circumferential end portions of the main magnets, and are magnetized orthogonal to the rotation axis and a radial direction, wherein the electromagnets include:
- yokes of which sectional shapes orthogonal to the rotation axis are substantially fan-shape; and
- a winding which is wound around the yokes, wherein a pair of the sub permanent magnets which are adjacent to each other along the circumferential direction is disposed so as to be shifted from the electromagnets to either side along the rotation axis, and wherein the axial gap motor further comprises:
- a slip ring which connects the windings with an electric source;
- an electrical device which reverses an electrical state from the electric source to the winding; and
- a setting device which sets: a strong field state in which the same magnetic pole as a pole facing the sub permanent magnet which is applied at a position where the electric magnets are shifted; and a weak field state in which the other magnetic pole from a pole facing the sub permanent magnet which is applied at a position where the electric magnets are shifted by the electrical device.

\* \* \* \* \*